Nov. 14, 1950    E. A. VOGEL ET AL    2,529,891
IMPULSE COUPLING
Filed Jan. 31, 1949

INVENTOR
EDWARD A. VOGEL
BY HOWARD R. LINDBECK
Paul L. Kroker
ATTORNEY

Patented Nov. 14, 1950

2,529,891

UNITED STATES PATENT OFFICE 2,529,891

IMPULSE COUPLING

Edward A. Vogel and Howard R. Lindbeck, Beloit, Wis., assignors to Fairbanks, Morse & Co., Chicago, Ill., a corporation of Illinois Application January 31, 1949, Serial No. 73,852

4 Claims. (Cl. 171—209)

This invention relates to improvements in impulse couplings for engine-driven magneto generators, and has particular reference to a reversible impulse coupling of improved construction, embodying novel and effective provisions for rendering the coupling fully adjustable in its operative connection of a magneto a driving element of the engine.

An object of the present invention is to provide an impulse coupling of readily reversible character, for engine-driven ignition magnetos, wherein the coupling is of improved construction such as to afford ready adjustments of coupling lug connection to the drive element of the associated engine, and a wide-range of coupling lag angle adjustment for ignition timing regulation in engine starting.

Another object is to provide an improved impulse coupling which is readily reversible to accommodate magnetos adapted for either clockwise or counterclockwise rotation, and which is fully adjustable in respect to its lug connection to the driving element of the engine, and in respect to the timing lag angle of the coupling, whether the coupling parts are related for clockwise or counterclockwise drive of the associated magneto.

A further object is to provide in an impulse coupling of the improved character indicated, novel and effective provisions for locking the relatively adjustable parts of the coupling, once adjustments are effected.

Other objects and advantages of the present invention will appear from the following description of a presently preferred embodiment thereof, as exemplified in the accompanying drawing, wherein.

Figure 1:
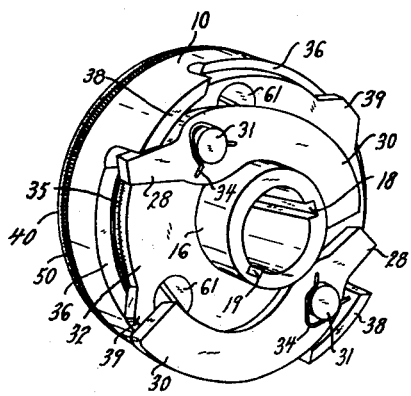
Fig. 1 is a view in perspective, of the presently improved impulse coupling, as viewed looking toward the pawl end of the coupling.

Referring to the drawing by suitable reference characters, the coupling includes a housing or coupling shell member 10 having a transverse wall 11 centrally apertured at 12 to accommodate therein one end 14 of a hub member 15. Hub member 15 is adapted in its end portion 16, for mounting on the projecting end of a magneto shaft (not shown), two key-ways 18 and 19 being provided in the hub portion 16 for selective use in keying the hub to the magneto shaft. Since in the present example, the coupling parts are arranged for clockwise magneto rotation, the key-way 18 is used in keying the hub to the magneto shaft. When the parts are reversed, as will be referred to hereinafter, key-way 19 then is employed in magneto mounting of the coupling.

Figure 4:
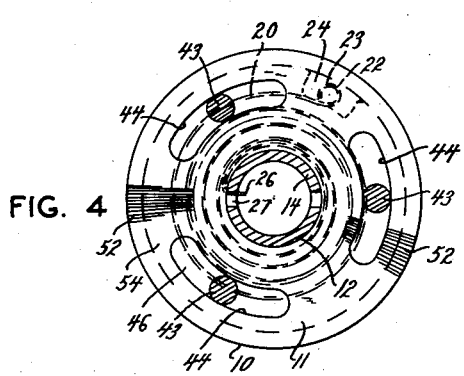
Fig. 4 is a view in transverse sectional elevation, as taken along line 4—4 of Fig. 3.

Arranged within the shell 10 is an impulse-drive spring 20 which has one end 22 seated in a pocket or recess 23 provided by a projection 24 (Fig. 4) preferably integral with the shell internally thereof. The opposite spring end 26 is engaged in a slot 27 formed in the hub end portion 16 (Fig. 4). The arrester mechanism of the coupling includes a pair of pawl members 28 each having a weighted tail portion 30. The pawls are diametrically opposed, and each is freely rotatable or rockable on a stud 31 suitably secured to a plate member 32, the pawl being removably held on its stud as by a cotter or lock pin 34 embracing the grooved outer end of the stud. The pawl plate 32 is carried by a disc-like extension 35 of the hub 15, the plate being adjustably connected to the latter in a manner presently to appear. The shell 10 has a stepped rim, presenting substantially flat arcuate margins 36 and diametrically opposite extensions 38, the latter serving as pawl camming elements for pawl release during magneto impulsing operations of the coupling in engine starting, and functioning further during normal engine running and in cooperation with projections 39 on the periphery of plate 32, to condition the coupling for rigid drive connection of the magneto and engine.

Figure 2:
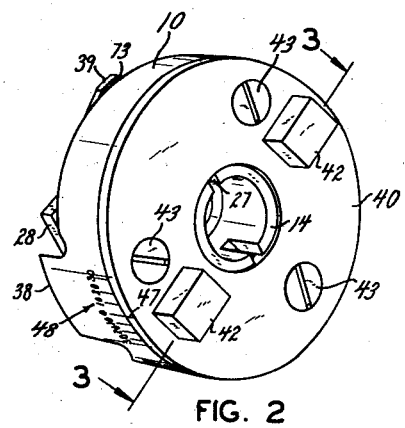
Fig. 2 is a perspective view looking toward the lug end of the coupling.
Figure 3:
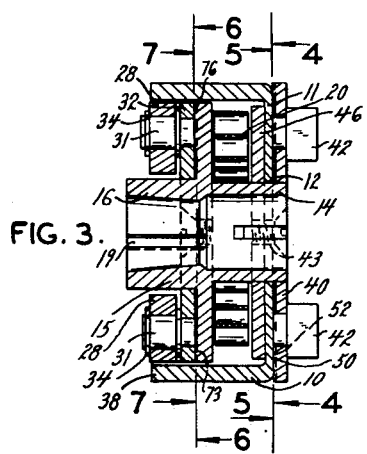
Fig. 3 is an axial sectional view of the coupling, showing structural features thereof, the view being taken along line 3—3 in Fig. 2.

Shell 10 here constitutes the driving element of the coupling, while the hub 15, together with the disc 35 and the pawl plate 32 thereon, constitutes the driven portion of the coupling. Engine drive of shell 10 is here effected in a manner permitting ready engine-connection adjustment for facilitating magneto timing regulation in respect to the engine cycle, in normal running operation. To this end, a separate lug plate 40 is provided for connection to the shell 10 against the shell wall 11, the lug plate having lugs 42 projecting therefrom for drive-connection with a rotating element of the engine (not shown). Plate 40 is apertured in its central area for receiving the end 14 of the coupling hub 15 (Fig. 2), whereby the plate is located concentrically of the coupling axis, and is further apertured to receive mounting screws 43. Screws 43 pass through arcuate slots 44 in the shell wall 11, and are engaged in threaded holes in a plate element 46 disposed internally of the shell against the inner side of wall 11 (Fig. 3). Slots 44 allow a range of angular adjustment of the lug plate 40 relative to the shell 10, while a reference mark 47 on the edge of plate 40 in cooperation with a scale 48 on the side of shell 10, provides visual indication of the extent of adjustments effected. In application of the presently improved impulse coupling to connect the magneto to the magneto driving element of the engine, the coupling connection is such that when the lug plate and coupling shell are adjusted for zero lug angle, as shown in Fig. 2, the magneto ignition discharge occurs when the lugs 42 are horizontal. Consequently, advance of the lug plate in one direction or the other from such zero angle setting, will alter the timing such that sparking will occur either before or after the horizontal position of the lugs 42. In general, however, it will be appreciated that the present lug angle adjustability of the coupling, adapts the coupling for magneto drive connection to an engine such as to secure any desired ignition discharge timing in respect to the engine operating cycle, within the range of adjustment provided by the length of the arcuate slots 44.

Figure 5:
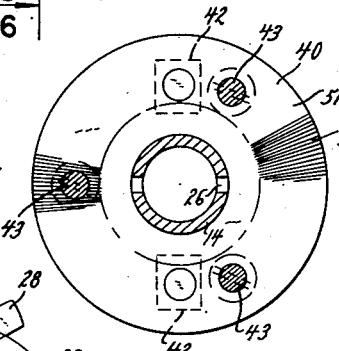
Fig. 5 is a transverse sectional view as taken along line 5—5 in Fig. 3.

An important feature of the present adjustable connection of the lug plate 40 to the shell 10, resides in the provision of a locking expedient to prevent slippage of the plate angularly relative to the shell, in any adjusted connection of these members. The locking provision is here constituted by radial teeth or serrations 50 formed over the circular face 51 of the plate 40 (Fig. 5), which teeth engage and interlock or mesh with like teeth or serrations 52 formed on and extending around the outer face 54 of the shell wall 11 (Fig. 4). For clarity of disclosure of other parts of the assembly, the teeth 50 and 52 are shown only in fragmentary portions in the figures referred to, it being understood that in each case, the teeth extend around the face on which they are formed. From the foregoing, then, it will be appreciated that the teeth or serrations when engaged in any adjusted setting of the shell and lug plate, effectively maintain the parts in adjusted assembly once the screws 43 are drawn up.

In the impulsing operation of the coupling in engine starting, one or the other of the pawls 28 periodically engages a stop element (not shown) which may be carried on a part of the magneto frame to extend into the path of the pawl ends when the pawls project outwardly over the rim margins 36 of the shell. A pawl so held by the stop element, is released therefrom by one of the shell cam elements 38 abutting the pawl as the shell is engine rotated. Whereupon, the impulse drive spring 20 functions to produce an accelerated rotation of the coupling hub assembly and therethrough the magneto rotor, to produce ignition discharge. As the engine approaches normal running, the pawl weights reacting to centrifugal forces, withdraw the pawls so that abutment thereof with the pawl stop element no longer takes place. Thereafter, the coupling affords a positive engine drive connection of the magneto in the manner before indicated.

In many instances, engine starting may be greatly facilitated by providing in the starting period, an ignition timing which differs from the timing obtaining during normal engine running. Adjustment of ignition timing to such end, is here afforded through the presently improved impulse coupling, by adjustment of the relative angular positions of the pawl plate 32 and the hub disc 35. The relative angular relation of these elements determines the timing of coupling impulse operation, and hence impulse ignition timing, through earlier or later pawl release from the stop element, by the coupling shell cam 38. As will be observed from Figs. 1, 6 and 7 in particular, pawl plate 32 is provided with holes 60 preferably three in number, equally angularly spaced as shown. These holes receive freely therethrough, mounting screws 61 for attachment of the plate to hub disc 35. Disc 35 has a plurality of threaded holes 62 therein, arranged in sets of three in equiangular spacing, these holes being provided to receive the screws 61 in plate mounting. In the present example, screws 61 are threaded in hub disc holes 64, 65 and 66, constituting one set of the holes 62. The resultant relative angular relation of plate 32 and disc 35 conditions the coupling for a predetermined timing of impulse operation, since such relation determines the angular extent of travel of the shell cam 38 toward and into abutment with that one of the pawls 28 held by the stop element, to release the same. The angular travel of the cam 38 necessary to effect pawl release, is termed the lag angle of the coupling, so that by providing a plurality of sets of holes in the disc 35, the lag angle may be varied within the limits set by the number of sets of such holes. Thus re-attaching the pawl plate 32 to hub disc 35 by threading the screws 61 in the hole set comprising the holes 68, 69 and 70 for example, will determine the lag angle of the coupling at a value different from that obtaining with the setting illustrated. In practice, the hole sets are suitably marked, as by appropriate indicia (not shown), so that adjustments for specific lag angles may be readily determined.

Figures 6, 7:
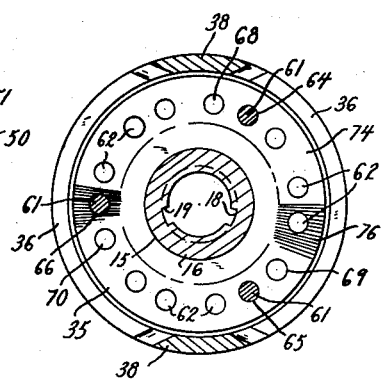
Fig. 6 is a transverse sectional view taken along line 6—6 in Fig. 3.
Fig. 7 is a transverse sectional view as taken along line 7—7 in Fig. 3.

As shown in Fig. 6, pawl plate 32 is formed to provide on its face 72, relatively fine radial teeth or serrations 73 over the annular extent of the face. Similarly, the face 74 of hub disc 35 (Fig. 7) has fine teeth or serrations 76 which, in the application of the pawl plate to the disc, mesh with the plate teeth 73. The meshed teeth while enhancing positive securement of the plate and disc by the screws 61, serve to prevent relative angular slippage of the connected members, which otherwise might occur to the extent of the clearance of screws 61 in the plate holes 60. As in the instance of the teeth 50 to 52 and for a like reason, the teeth 73 and 76 are shown only in fragmentary part, it being understood that these teeth continue around the faces of the members on which they are formed.

The presently improved impulse coupling is readily reversible to accommodate magnetos adapted for either clockwise or counterclockwise operation of the magneto rotor. The coupling herein illustrated, has its parts related for clockwise magneto drive. Now to reverse the coupling, the impulsing spring is assembled in reverse order to that shown in Fig. 4, such that the spring coils wind in the opposite direction. Further, the pawls 28 are re-applied to the studs 31 such that each is positioned oppositely to the position shown in Fig. 6, while in keying the coupling hub 15 on the magneto rotor shaft, the hub key-way 19 is utilized. The desired coupling lag angle in the reversed coupling assembly, is obtained in the manner hereinbefore described, as by threading the pawl plate attachment screws 61 in that set of the disc holes 60 which is predetermined and indicated by suitably marking, to afford the selected lag angle according to the reversed assembly of the coupling parts.

Having now described and illustrated a presently preferred embodiment of the invention, what we desire to claim and secure by Letters Patent is:

1. In an impulse coupling for a magneto, a cup-shaped driving member, a driven member including a magneto shaft mounting hub and a disc thereon, a pawl plate adapted for mounting in face-to-face relation with the hub disc, pawl elements carried by said pawl plate, said hub disc having a plurality of threaded holes therein arranged in sets, said pawl plate having holes therein equal in number to the number of holes in each of the sets of holes in the hub disc, threaded elements for attaching the pawl plate to the disc, said threaded elements extending through the holes in the pawl plate and threaded into the holes of a selected set of the threaded holes in the hub disc, thereby connecting the pawl plate and disc in relative angular positions determined by the selected set of disc holes receiving the threaded elements, and interengaging radial teeth on the mating faces of the pawl plate and hub disc.

2. In an impulse coupling for a magneto, a cup-shaped driving member providing a transverse wall portion having arcuate slots therein, a drive lug member adapted for mounting against said transverse wall, means including elements extending through said slots, for connecting the lug member and driving member in selected relative angular positions within limits determined by the arcuate extent of said slots, a coupling driven member comprising a magneto shaft mounting hub and a disc thereon having a plurality of threaded holes arranged in sets, a spring interconnecting said driving and driven members, a pawl plate having equally spaced holes therein, pawls pivotally carried on said pawl plate, and threaded elements for attaching said pawl plate in face-to-face relation to said disc, said threaded elements extending through the holes in the pawl plate and threaded into the holes of a selected set of said threaded holes in the disc, thereby connecting the pawl plate and disc in a relative angular relation determined by the selected set of disc holes receiving the threaded elements.

3. In an impulse coupling as set forth in claim 2, wherein the opposed faces of said lug member and the transverse wall of the driving member are provided with radial teeth adapted for interengagement in the connection of the lug plate to the driving member.

4. In an impulse coupling as set forth in claim 2, wherein the opposed faces of said pawl plate and hub disc are provided with radial teeth adapted for interengagement in the connection of the pawl plate to the hub disc.

EDWARD A. VOGEL.
HOWARD R. LINDBECK.

REFERENCES CITED

The following references are of record in the file of this patent:

UNITED STATES PATENTS

| Number | Name | Date |
| --- | --- | --- |
| 1,177,638 | Larsen | Apr. 4, 1916 |
| 1,365,700 | Kliesrath | Jan. 18, 1921 |
| 2,161,956 | Robertson | June 13, 1939 |